United States Patent
Rudolf et al.

(10) Patent No.: US 8,407,884 B2
(45) Date of Patent: Apr. 2, 2013

(54) CORE REMOVAL WITH MATTRESSES OF CELLULAR MATERIAL

(75) Inventors: Erich Rudolf, Viernheim (DE); Axel Stoll, Hohen-Sulzen (DE)

(73) Assignee: Fillmatic Polsterindustriemaschinen GmbH, Mannheim (DE)

( * ) Notice: Subject to any disclaimer, the term of this patent is extended or adjusted under 35 U.S.C. 154(b) by 276 days.

(21) Appl. No.: 12/923,315

(22) Filed: Sep. 14, 2010

(65) Prior Publication Data

US 2011/0197436 A1 Aug. 18, 2011

(30) Foreign Application Priority Data

Feb. 15, 2010 (EP) .................................. 10153584

(51) Int. Cl.
*B26D 1/00* (2006.01)
*B26D 7/18* (2006.01)

(52) U.S. Cl. ........... 29/700; 29/426.1; 29/426.5; 29/709
(58) Field of Classification Search ................. 29/426.1, 29/426.5, 700, 709
See application file for complete search history.

(56) References Cited

U.S. PATENT DOCUMENTS

| 5,229,138 | A  | * | 7/1993 | Carotti ........................... | 425/4 C |
| 6,312,244 | B1 | * | 11/2001 | Levera et al. .................. | 425/4 C |
| 7,651,645 | B2 | * | 1/2010 | Taylor .......................... | 264/46.2 |

FOREIGN PATENT DOCUMENTS

| EP | 2 149 436 | | 7/2008 |
| EP | 2149436 | A1 * | 2/2010 |

* cited by examiner

*Primary Examiner* — Peter DungBa Vo
*Assistant Examiner* — Anthony Green
(74) *Attorney, Agent, or Firm* — Staas & Halsey LLP

(57) ABSTRACT

A device for removing of profiles cut out from mattresses of cellular material including at least one conveyor, onto which a mattress of cellular material is laid. The mattress is led towards a turn around device for bending the mattress. At the turn around device at least an adjustable gap for a brush, at least an adjustable back pressure member and at least an adjustable brush are provided. The member bends the mattress into the gap and the brush removes the cut out profiles from the bend in the mattress.

9 Claims, 2 Drawing Sheets

CORE REMOVAL WITH MATTRESSES OF CELLULAR MATERIAL

BACKGROUND OF THE INVENTION

Field of the Invention

The invention relates to core removal of mattresses of cellular material, i.e. a device for removing profiles cut out from mattresses of cellular material.

Mattresses of cellular material are treated with profiled cuts for aerating and/or for forming regions with different rigidity. After cutting, the cut profiles remain initially inside the mattresses as so-called cores having to be picked out onerously.

Conventional solutions for removing profiles cut out from mattresses of cellular material all have one thing in common: the mattress is bent for core removal at 180°, in order to open on the outside of the bend the cut free edges of the mattresses to take out more easily the cores. Workers manually pick out die cores at the outside bend of the mattresses.

In some cases brushes or lamellae wheels with soft plastic lamellae are mounted at the outside bend for automatically brushing or beating of the cores. A machine with a combination of two of such 180°-bends is commercially produced in Italy. For many profiled forms the automatic cleaning is only half successful. Many times manual work is still required afterwards, necessitating the mattress to be turned over manually. Thus, in spite of the automatic pre-cleaning, onerous physical work with a high load to the back has to be done in order to entirely remove the profiles cut out from the mattresses.

SUMMARY OF THE INVENTION

It is an object of the invention to provide a device for removing profiles cut out from mattresses of cellular material, while avoiding the disadvantages of the state of the art.

The solution is provided with a device for removing of profiles cut out from mattresses of cellular material with the features of claim 1.

According to the invention a device for removing profiles cut out from mattresses of cellular material includes at least one conveyor, onto which the mattress is laid. The mattress is led towards a turn around device for bending of the mattress at preferably 180°. At the turn around device an adjustable gap for a brush, an adjustable back pressure roll and an adjustable brush are provided. A surface of the mattress led towards the gap is accessible through the gap and a surface opposite to the accessible surface of the mattress is urged by the back pressure roll towards the gap. As a consequence, the surface of the mattress that is accessible through the adjustable gap is extended. The brush is positioned towards the surface of the mattress that is accessible. The cut out profiles can be seized by the brush through the adjustable gap and can be pulled out during conveyance of the mattress along the gap from the preferably adjustably rotating brush.

According to the invention the effect of cleaning of the mattress is automatically improved by the arrangement of conveyors, adjustable gap and adjustable back pressure roll allowing, with the positioning of the mattress at the bend of 180° by pressure from behind to push the mattress through the gap so that the adjustable brush can seize and brush out the cut out profiles stuck in the surface 8 of the mattress. By adjusting the gap, position of the back pressure roll and position of the brush, the automatic core removal can be optimized in such a way that even profile cuts difficult to clean get almost entirely cleaned out due to the turn around geometry being adaptable to the thickness of the mattress and the shape of the profile cuts.

According to a preferred embodiment of the invention a ventilation installation conveys the profile cores brushed out and leads them through pipes towards a litter bin over a distance of possibly up to 80 m.

The set-up of the machine allows that the operator, after laying of the mattress and starting the procedure, finds after a few seconds the cleaned site again in front of him on the conveyor for control and may be picking out any possibly remaining single cores. With a second start command the mattress is sent for cleaning of the other side. It is the lower side lying on the conveyor that is cleaned and turns up on the return as the upper side for visual control and easily accessible for more cleaning if applicable.

Cross cuts may be cleaned after turning of the mattress 90° as well as transverse relative to the direction of cut of the first transport, if due to the depth of the cuts the core removal during the first run was effected exclusively in a longitudinal direction. The mattresses may pass longitudinally and transversally through the machine.

The combination of a Fillmatic Stack-Robot installation for supply and drainage allows for control of the just cleaned side on the input conveyor of the device for removing of the profiles cut out from mattresses without any physical engagement. With this option the stack-robot does the supply of the fresh mattresses and the stacking of the cleaned mattresses, and the operator has only the duty of visual control. For profiles easy to clean and not needing any control of the cleaning there is an automatic program allowing entire robot operation.

The invention is described subsequently by way of preferred embodiments.

DESCRIPTION OF THE EMBODIMENTS

Figure 1:
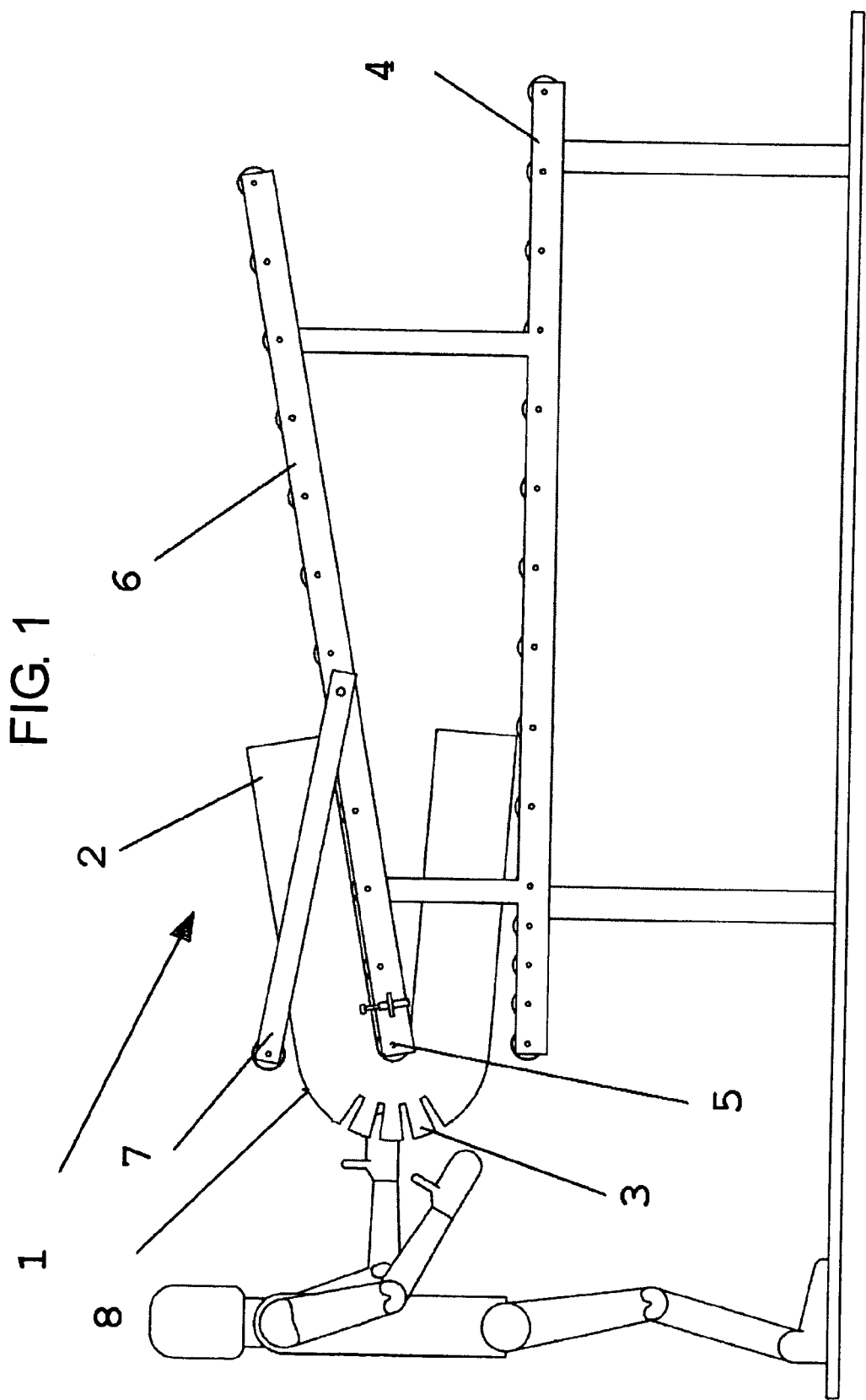
FIG. 1 shows a conventional device for removing profiles cut out from mattresses of cellular material.

FIG. 1: A device 1 for removing profiles cut out from a surface of a mattress of cellular material 2 between remaining cellular material 3 includes a first conveyor 4, onto which the mattress 2 is laid and which leads the mattress 2 towards a front edge 5 of a second conveyor 6 around which the mattress 2 is manually bent around about 180° below a lever 7 and conveyed back. Cut out profiles may be pulled out from the surface 8 of the mattress 2 accessible near the front edge 5.

Figure 2:
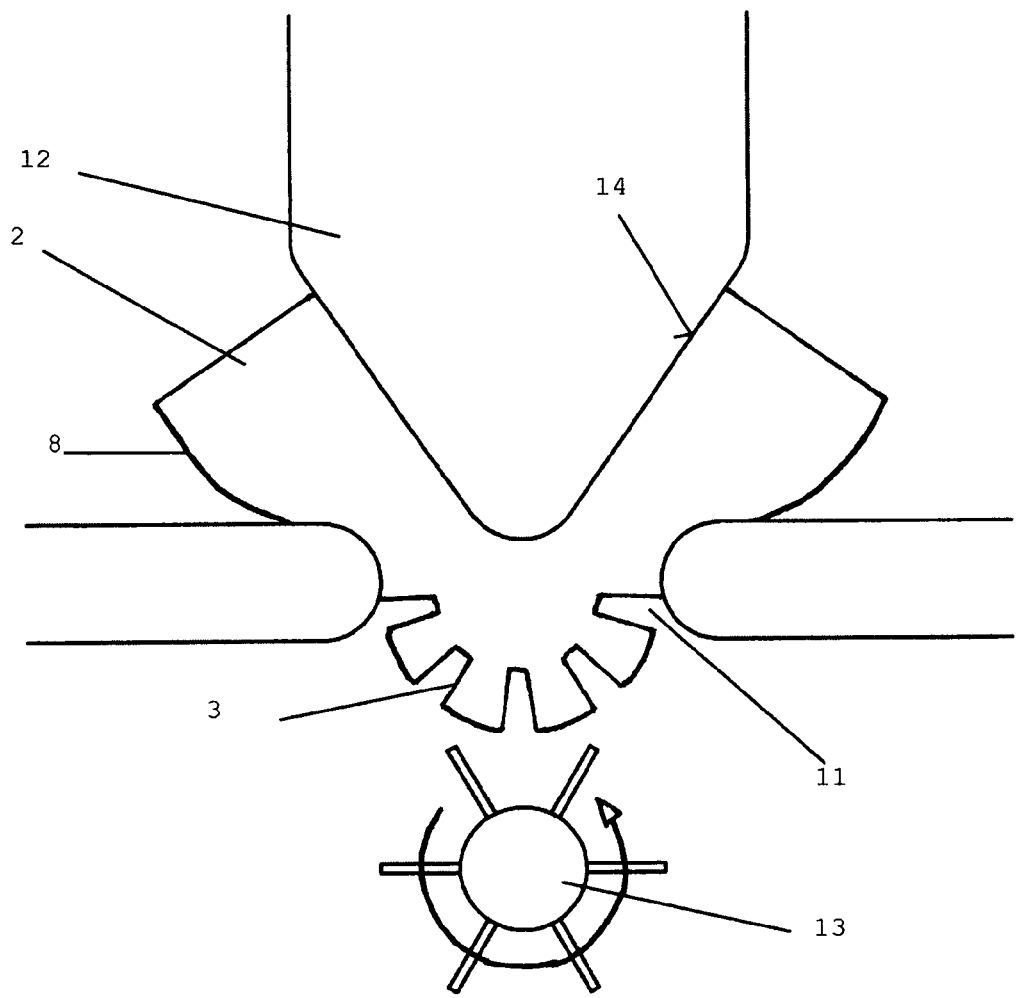
FIG. 2 shows a turn around device for removing profiles cut out from mattresses of cellular material according to the invention.

FIG. 2: Corresponding features are referenced with the reference numbers of FIG. 1. A device 1 for removing profiles cut out from a surface of a mattress 2 between remaining cellular material 3 includes a conveyor, onto which the mattress 2 is laid. The mattress 2 may be, e.g., up to 2.2 m long, up to 2.2 m wide, and up to 0.1 0.4 m high. The mattress 2 is put on the conveyor in a way that at least one of the cut directions is facing downwards with their openings being transversal relative to the direction of conveyance.

The mattress 2 is taken by the conveyor to a turn-around device for bending of the mattress 2 preferably 180°. At the turn around device an adjustable gap for a brush 11, an adjustable back pressure roll 12 and an adjustable brush 13 are provided. A surface 8 of the mattress 2 led towards the gap 11 is accessible through the gap 11. The gap 11 is adjustable to the height of the mattress 2.

A surface 14 opposite to the accessible surface 8 of the mattress 2 is urged by the back pressure roll 12 towards the gap 11. As a consequence the surface 8 of the mattress 2 that is accessible through the adjustable gap 11 is extended. The pressure from the back pressure roll 12 towards the gap 11 is related to the depth of the cut out profiles and the shape of the cuts. The deeper and the more curved the cuts, the more the back pressure roll 12 has to be advanced in a direction towards the gap 11 with the limit being that the mattress 2 is not torn.

The brush 13 may be positioned in such a way relative to the surface 8 that is accessible through the gap 11 that the cut out profiles can be seized by the brush before the gap 11 and can be pulled out during conveyance of the mattress 2 along the gap 11 from the preferably adjustably rotating brush 13. The brush 13 may be different according to the quality of the cellular material: a brush with densely arranged bristles, a brush with singular bushels of bristles or a brush beating with lamellae instead of bristles against the surface of the cellular material.

The set-up of the machine 1 allows the operator, after laying the mattress and starting the procedure, to find the cleaned surface 8 again in front of him on the conveyor for control and he may be picking out any possibly remaining single cores. With a second start command the mattress 2 is sent on the conveyor for cleaning of the other side 14 again towards the gap 11, if applicable.

Cross cuts may be cleaned after turning the mattress 90° as well as transversal relative to the direction of cut of the first transport, if due to the depth of the cuts the core removal during the first run was effected exclusively in a longitudinal direction. The mattresses 2 may pass longitudinally and transversally through the device 1.

For profiles easy to clean there is an automatic program provided allowing entire robot operation.

The invention claimed is:

1. A device for removing profiles cut out from mattresses of cellular material, comprising:
    at least one conveyor, onto which a mattress of cellular material is laid, leading the mattress towards a turn around device for bending the mattress;
    at the turn around device, at least an adjustable gap, at least an adjustable back pressure member and at least an adjustable brush are provided,
    wherein a first surface of the mattress is accessible through the gap and a second surface opposite to the first surface is bent by the back pressure member into the gap,
    wherein the brush is positioned towards the first surface so that a cut out profile in the first surface can be contacted by the brush; and
    a ventilation installation provided near the brush or gap to collect the brushed out profile.

2. The device according to claim 1, wherein a geometry of turn around is adjustable to a shape of the mattress, particularly a height of the mattress and a shape of the cut out profiles.

3. The device according to claim 1, wherein the brush is adjustably rotatingly driven.

4. A device for removing profiles cut out from mattresses of cellular material, comprising:
    at least one conveyor, onto which a mattress of cellular material is laid, leading the mattress towards a turn around device for bending the mattress;
    at the turn around device, at least an adjustable gap, at least an adjustable back pressure member and at least an adjustable brush are provided,
    wherein a first surface of the mattress is accessible through the gap and a second surface opposite to the first surface is bent by the back pressure member into the gap,
    wherein the brush is positioned towards the first surface so that a cut out profile in the first surface can be contacted by the brush;
    and, wherein a protection device is provided against manual access into the gap.

5. The device according to claim 4, wherein a geometry of turn around is adjustable to a shape of the mattress, particularly a height of the mattress and a shape of the cut out profiles.

6. The device according to claim 4, wherein the brush is adjustably rotatingly driven.

7. A device for removing profiles cut out from mattresses of cellular material, comprising:
    at least one conveyor, onto which a mattress of cellular material is laid, leading the mattress towards a turn around device for bending the mattress;
    at the turn around device, at least an adjustable gap, at least an adjustable back pressure member and at least an adjustable brush are provided,
    wherein a first surface of the mattress is accessible through the gap and a second surface opposite to the first surface is bent by the back pressure member into the gap,
    wherein the brush is positioned towards the first surface of the mattress so that a cut out profile in the first surface of can be contacted by the brush, and
    a program control in a memory, in which is stored adjustments including any one or a combination of profile cuts, height of the mattress, speed of the conveyor, opening of the gap, position of the back pressure member or position of the brush for automatic control of the device.

8. The device according to claim 7, wherein a geometry of turn around is adjustable to a shape of the mattress, particularly a height of the mattress and a shape of the cut out profiles.

9. The device according to claim 7, wherein the brush is adjustably rotatingly driven.

* * * * *